United States Patent [19]

Chapman

[11] Patent Number: 4,579,545

[45] Date of Patent: Apr. 1, 1986

[54] FLEXIBLE COUPLING USING TOROIDAL JOINT

[75] Inventor: F. Abbott Chapman, New Hartford, N.Y.

[73] Assignee: Allied Corporation, Morris Township, Morris County, N.J.

[21] Appl. No.: 528,694

[22] Filed: Sep. 1, 1983

[51] Int. Cl.⁴ .......................... F16D 3/50; F16D 3/52; F16D 3/56

[52] U.S. Cl. ..................... 464/79; 403/335; 464/92; 464/99; 464/147

[58] Field of Search ................. 464/79, 80, 92, 99, 464/106, 110, 147, 170, 171, 173, 177, 98; 403/335, 336

[56] References Cited

U.S. PATENT DOCUMENTS

| | | | |
|---|---|---|---|
| 1,045,791 | 11/1912 | Hodge | 464/99 X |
| 1,107,315 | 8/1914 | Krebs | 464/80 |
| 1,639,480 | 8/1927 | Baumann | 464/79 |
| 1,664,052 | 3/1928 | Ungar | 464/80 |
| 1,676,676 | 7/1928 | Weiland | 464/80 |
| 3,233,428 | 2/1966 | Chalpin | 464/79 |
| 3,326,344 | 6/1967 | Hackforth | 464/80 X |
| 3,959,988 | 6/1976 | McNamee | 464/79 |
| 4,276,758 | 7/1981 | Coman et al. | 464/99 X |
| 4,384,858 | 5/1983 | Kronert et al. | 464/92 X |

FOREIGN PATENT DOCUMENTS

| | | | |
|---|---|---|---|
| 695949 | 12/1930 | France | 464/79 |
| 2374555 | 7/1978 | France . | |
| 2499184 | 8/1982 | France . | |
| 208008 | 1/1924 | United Kingdom . | |

Primary Examiner—John Petrakes
Attorney, Agent, or Firm—Stan Protigal; Howard Massung

[57] ABSTRACT

A flexible coupling (11) is formed with a toroidal diaphragm (21-22) as its flexible member. A pair of half-toroids (21-22) are fixed to inner rings (25, 26) and outer rings (27, 28) in order to effect connections. The inner rings (25, 26) are connected, respectively, to drive shaft sections (13, 14). The outer rings (27, 28) are used to connect the half-toroids (21-22) to each other. Torque from one of the drive shaft sections (13) is passed through one of the inner rings (23), through one of the diaphragms (21) through the outer rings (27 and 28) to the other diaphragms (22), the other inner ring (26) and to the other drive shaft section (14). Advantages include increased flexibility of a flexible coupling of a type which uses no bearing parts.

8 Claims, 2 Drawing Figures

FLEXIBLE COUPLING USING TOROIDAL JOINT

BACKGROUND OF THE INVENTION

This invention relates to joints for rotating members, and more particularly to a flexible coupling in which misalignment is compensated for by some of the material in the joint being flexible.

When rotary movement is transferred along a drive shaft or similar member, misalignment of driving and driven members my require some flexibility in the joint. In some applications, this flexibility is accomplished by allowing component parts to move relative to one another across bearing surfaces. A typical application of this is a drive train in which universal joints and splined shafts allow for angular and axial displacement of the drive train components. A drive shaft itself maybe flexible, although this can create problems in that the mass of the drive shaft combined with the flexibility can create a dynamically unstable condition when the drive shaft is expected to operate at significant rotational speeds. Flexible portions may be placed near stabilized bearing supports in order that such dynamic instability does not occur. This invention relates to such flexible portions, called flexible couplings.

In the prior art, flexible couplings have been formed from thin metal diaphragms extending radially from adjacent drive shaft portions, with pairs of the diaphragms being joined at the outer circumference. Such an arrangement is shown in U.S. Pat. No. 4,276,758, assigned to the assignee of the present invention. Specifically, in the prior art arrangement shown in that patent, a pair of drive shaft sections are joined by a pair of discs extending radially outwardly from the drive shaft sections. The discs taper toward the perimeter, where (at the perimeter) the discs have a thickened portion. The thickened portion serves as a spacer for keeping the remainder of each disc separate from the other. The two discs are joined at the thickened portion, i.e., at the perimeter. The amount of misalignment and/or axial movement that can be tolerated between the two shafts is a function of the stresses these movements develop within the disc or diaphragm. Each disc or diaphragm deforms equally in the total movement. The total amount axial and/or angular misalignment this type of disc can withstand is relatively small. If greater amounts of misalignment are to be compensated for, additional sets of discs are required.

It is accordingly an object of the present invention to provide a flexible coupling or flexible shaft end portion, which does not rely on rubbing, contacting or bearing parts to transmit drive force. It is desired that such a flexible coupling be able to compensate for alignment errors which are much greater than those which can be compensated for with a disc-type flexible coupling. It is further important that such a flexible coupling have an extended lifetime. This means that the flexible coupling must be able to flex a large number of times and must be able to withstand the same continuous and intermittent loads as the rest of its associated drive train. It is a further object to provide a flexible coupling which can handle extreme misalignments when the extreme misalignments occur and which does not require a significant amount of maintenance.

SUMMARY OF THE INVENTION

The present invention contemplates a flexible coupling for a rotary drive shaft in which two drive shaft sections are joined by a flexible toroidal diaphragm. The diaphragm consists of a pair of half-toroids, each generated by a section of a plane open curve rotated about a line in its plane that does not intersect the curve. The half-toroids are each joined to respective ones of the two drive shaft sections at an internal edge of each half-toroid and to an outer ring at an outer edge of each half-toroid. The outer rings are then joined together in order to join the two drive shaft sections by means of the resulting toroid. The half toroid are parabolic or have an imaginary line, defined by a focus, which is within the half-toroid. This arrangement enables the two drive shaft sections to operate with considerable bending angles and with a large range of separation distances, as compared to conventional disc-type couplings. Since no bearing joints are utilized, wear and maintenance are considerably reduced.

DETAILED DESCRIPTION OF THE PREFERRED EMBODIMENT

Figure 1:
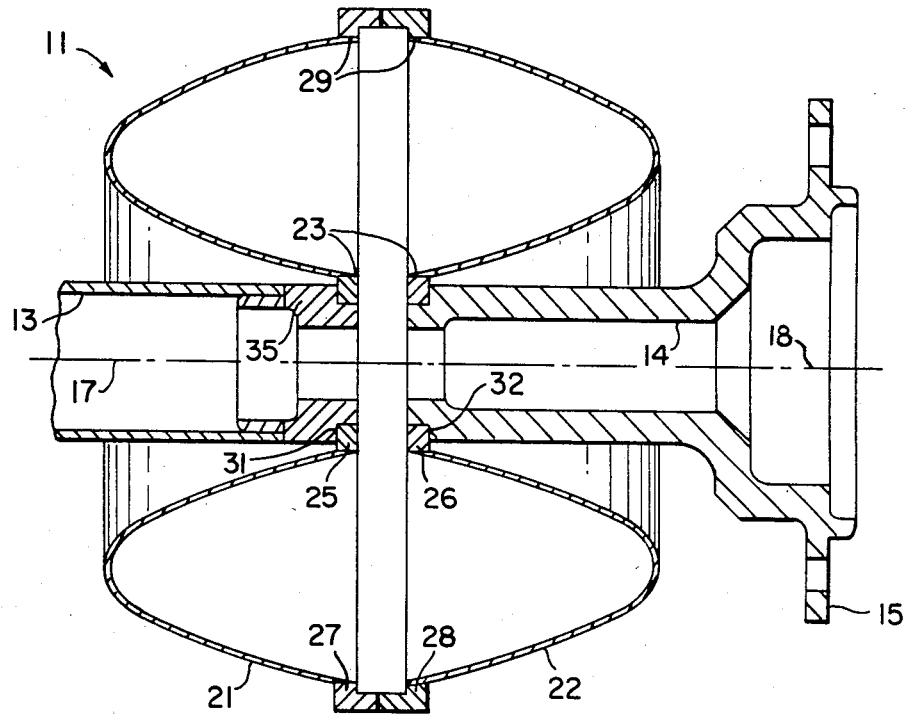
FIG. 1 shows a cross-sectional view taken along the center axes of a flexible coupling formed in accordance with the preferred embodiment of the invention.

Referring to FIG. 1, a flexible coupling 11 constructed in accordance with a preferred embodiment of the invention is used to connect two drive shaft sections to form a drive shaft with a flexible end. The flexible coupling 11 is placed near the end of the drive shaft 13-14. Drive shaft section 13 will be called the main shaft section of the drive shaft and drive shaft section 14 will be called the stub shaft section of the drive shaft. The stub shaft section 14 is adapted to be mounted to a further drive assembly (not shown) by means of a flange 15. The stub shaft section 14 is restrained in its angular and longitudinal positions by appropriate bearings (not shown) which may be either attached to the stub shaft 14, or to an element to which the stub shaft 14 is mounted. The purpose of the flexible coupling 11 is to permit the stub shaft 14 to move axially and angularly with respect to the main shaft 13, but only as dictated by the relative position of the bearings with respect to the main shaft section 13. This movement is from a predetermined neutral position (shown), which may or may not be the actual average relative position of the stub shaft 14 under any given circumstances, but is usually defined with the shaft sections 13, 14 axially aligned.

The drive shaft sections 13, 14 have center axis 17, 18, respectively which coincide when the drive shaft sections 13, 14 are angularly and axially aligned. The flexible coupling 11 consists of a pair of diaphragms 21, 22, each of which is formed as a half-toroid. In the preferred embodiment as shown in FIG. 1, the half-toroids have neutral shapes which are generated by parabolic curves rotated about the center axis 17 or 18 of respective drive shaft sections 13, 14. The diaphragms 21, 22 are flexible so that the drive shaft sections 13, 14 can become axially and angularly misaligned, as well as axially separated by varying amounts, thus enabling the flexible coupling 11 to flex.

Each diaphragm 21, 22 is fixed at inner open ends 23 to an inner ring 25 or 26, respectively, by fusion means such as electron beam welding. The diaphragms 21, 22 are each attached to an outer ring 27 or 28 respectively, at outer open ends 29 of the diaphragms 21, 22, by similar fusion techniques. The inner and outer rings 25-28 form attachment points for connecting the diaphragms 21, 22 mechanically in series with the drive shaft sections 13, 14. As a result of this structure, torque to be transferred between the two drive shaft sections 13, 14 must be transferred through each diaphragm 21, 22. The outer rings 27, 28 are preferably rigid, although it is theoretically possible to use flexible members as the outer rings 27, 28.

Figure 2:
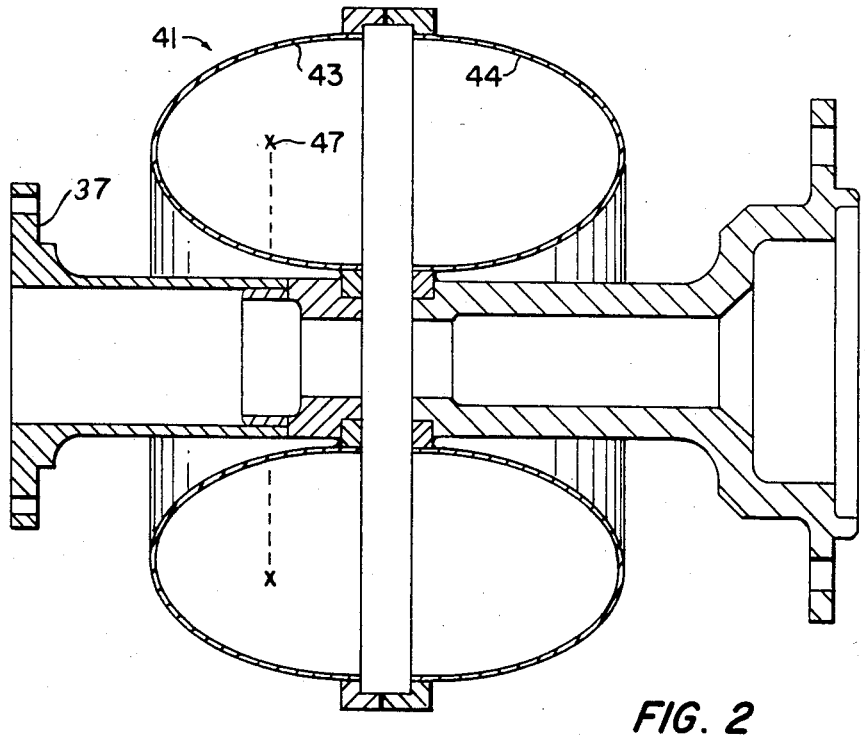
FIG. 2 shows a cross-sectional view of a flexible coupling formed in accordance with an alternate embodiment of the invention.

The inner rings 25, 26 are fixed to the drive shaft sections 13, 14 at attachment interfaces 31, 32. The inner rings 25, 26 are preferably made of the same or a compatible material as the drive shaft sections 13, 14 at the attachment interfaces 31, 32, so that the inner rings 25, 26 may be fusion bonded to the drive shaft sections 13, 14. In the event that one of the drive shaft sections, such as the main shaft 13, is made of a diverse material not readily weldable to the diaphragm material, an attachment member 35 is used to terminate the drive shaft section 13 so as to facilitate fusion bonding to the inner ring 25. This attachment member 35 is also appropriate if the drive shaft section 13 is considered to be too thin to support the inner ring 25, even though such drive shaft sections 13 could be double butted tubes. As shown in FIG. 2, a flanged member 37 may be used to attach a flexible coupling, such as flexible coupling 41, to a separate drive shaft section (not shown). The separate drive shaft section may be made of a material not readily weldable to the diaphram material or the flanged member 37.

Referring back to FIG. 1, when the inner rings 25, 26 have been fused to the drive shaft section 13, 14 the outer rings 27, 28 are welded together, thus completing the flexible coupling 11 and torsionally connecting the drive shaft sections 13, 14.

Referring again to FIG. 2, it is possible to construct a flexible coupling, such as flexible coupling 41, so that its diaphragms 43, 44 have a shape other than that of a parabola. In this case, the diaphragms 43, 44 are formed as half-toroids generated by a section of an elliptical curve. Each half section, such as half section 43, must have a focus 47, which is within the confines of the half-toroid. The half section 43 is preferably configured so that, during most of the time that the coupling 41 is operating, when the coupling 41 is distorted by flexing of the coupling 41, the focus 47 remains within the half section 43, to the extent that a focus can remain identifiable.

It can be seen from the above that sundry modifications can be made to the preferred embodiments while remaining within the scope of the invention. For this reason, it is desired that the invention be read as limited only by the claims.

What is claimed is:

1. A flexible coupling for transmitting torque between first and second shaft sections, wherein the first shaft section is positioned in approximate alignment with the second shaft section, characterized by:
   a metallic diaphragm having a neutral shape of a pair of half-toroids, having inner open ends and outer open ends, the half-toroids joined together by outer attachment rings which are welded by the diaphragm at the outer open ends and not at the inner open ends to approximate a toroid which is closed except at the inner open ends;
   each half toroid being formed as a plane open curved rotated about a center axis, in which, when the diaphragm is in the neutral state, at least one focus of the plane open curve is within its half-toroid;
   means for attaching each of the inner open ends to the first and second shafts, respectively.

2. Apparatus as described in claim 1, further characterized in that:
   the half-toroids each have a neutral shape which is approximately defined by a parabolic curve rotated about a center axis of the half-toroid.

3. Apparatus as described in claim 2, further characterized in that:
   each half toroid is formed as a plane open curve rotated about a center axis, in which, when the diaphragm is in the neutral state, at least one focus of the plane open curve is within its half-toroid.

4. Apparatus as described in claim 3, further characterized in that:
   the half-toroids are configured so that, during normal operation, the approximate location of said focus remains within the plane open curve.

5. Apparatus as described in claim 1, further characterized by:
   the half-toroids being configured so that, during normal operation, the approximate location of said focus remains within the plane open curve.

6. Apparatus as described in claim 1, further characterized in that:
   each half-toroid is fixed at its inner open end to an inner attachment ring, the inner attachment ring being attachable to one of the shaft sections;
   the flexible couplng is completed in its assembly by firstly attaching the inner attachment rings to the shaft sections and secondly attaching together the outer attachment rings associated with each half-toroid.

7. Apparatus as described in claim 6, further characterized in that:
   the outer attachment rings are substantially rigid.

8. Apparatus as described in claim 6, further characterized in that:
   the outer attachment rings are substantially flexible.

* * * * *